Aug. 24, 1948.    L. D. RICHARDS    2,447,714
FOOD GRATER
Filed Oct. 27, 1947    2 Sheets-Sheet 1
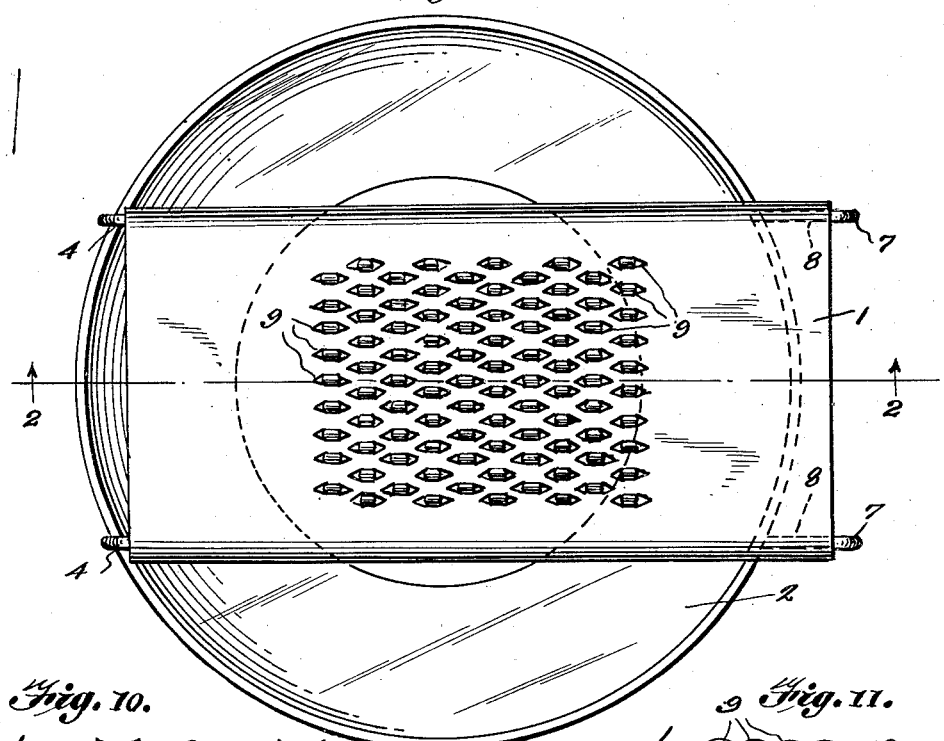
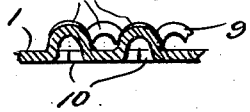
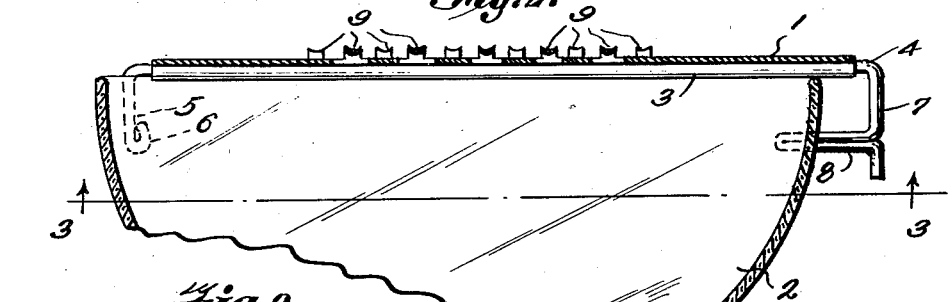
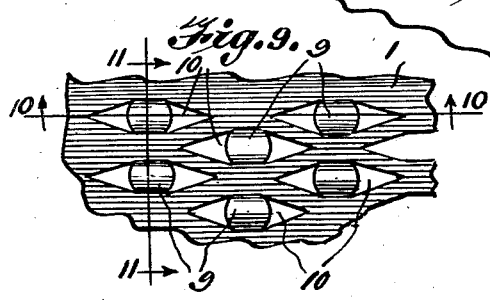
INVENTOR.
LILLIAN DENNIS RICHARDS
BY Aug. 24, 1948.   L. D. RICHARDS   2,447,714
FOOD GRATER
Filed Oct. 27, 1947   2 Sheets-Sheet 2
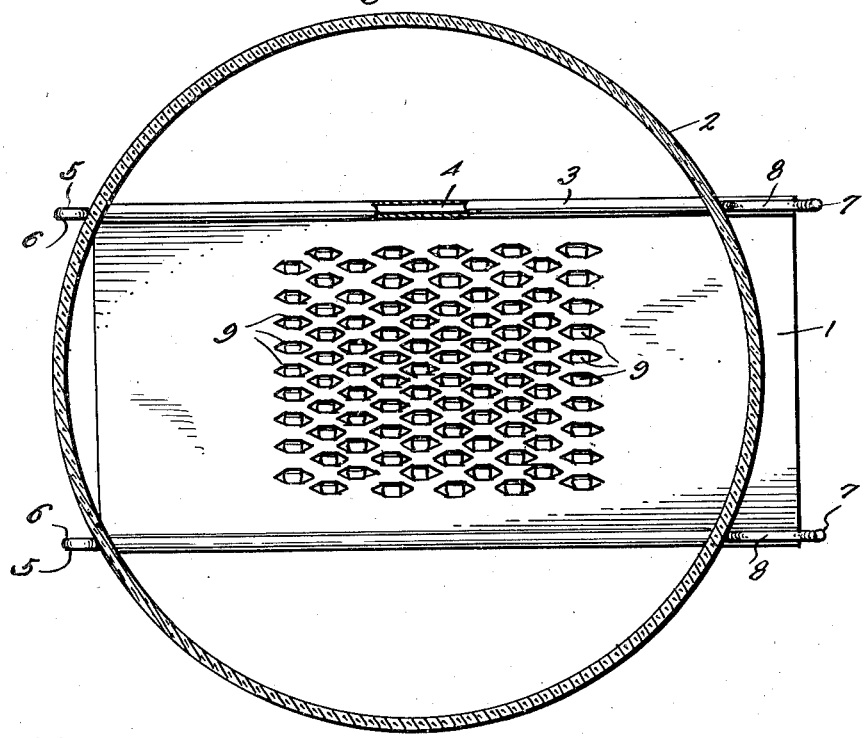
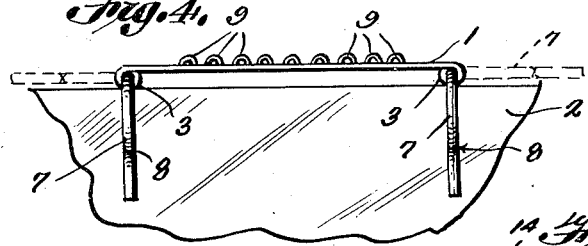
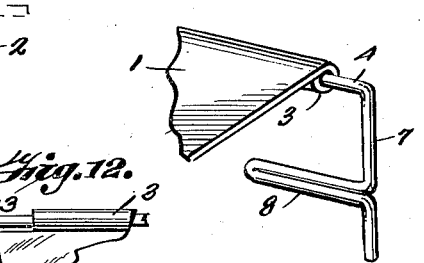
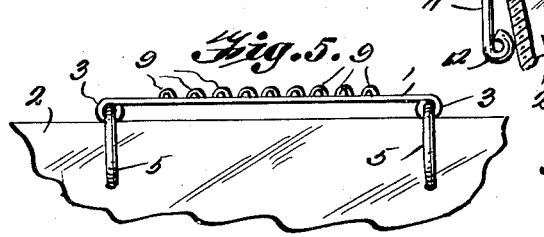
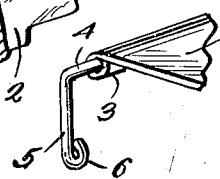
INVENTOR.
LILLIAN DENNIS RICHARDS
BY
Ross H Woodward Patented Aug. 24, 1948

2,447,714

UNITED STATES PATENT OFFICE 2,447,714

FOOD GRATER

Lillian Dennis Richards, Washington, D. C.

Application October 27, 1947, Serial No. 782,285

6 Claims. (Cl. 146—180)

1

This invention relates to a food grater which is intended for use in a kitchen or other place where food is prepared and it is one object of the invention to provide a grater so formed that it may be mounted across the top of an open bowl or pan or held upright upon a flat board or metal sheet with one hand while food is grated with the other hand.

Another object of the invention is to provide a food grater formed of sheet metal and carrying securing members along its sides, which so mounted, that they may be moved into position to grip side portions of a bowl or pan when the grater is in use and thus make it unnecessary to manually hold the grater in place in order to prevent it from slipping off of the bowl or pan.

Another object of the invention is to so form and mount the securing members, that they may be folded flat against the under face of the grater where they will be out of the way and allow the grater to be placed in a drawer of a table together with knives and other kitchen implements and readily removed when needed without becoming entangled with the other implements in the drawer.

Another object of the invention is to provide a grater having cutters so formed, that when the grater is in use food will be formed into flakes of substantially the same size and thus produce a flaky mass of grated food material which will be free from lumps and attractive in appearance when used for making a salad or the like.

Another object of the invention is to provide a grater, having cutters arranged in a mass located in such spaced relation to margins of the sheet metal body of the grater, that when the grater is in use, all of the flaked material formed will drop into a bowl or other receptacle upon which the grater is mounted and thus prevent waste of the grated material.

Another object of the invention is to so locate the mass of cutters, that when the grater is held upright for use, its upper portion may be grasped and firmly held without likelihood of a person's fingers being scratched or otherwise injured.

The invention is illustrated in the accompanying drawings wherein:

Fig. 1 is a top plan view showing the improved grater applied to a bowl in position for use.

Fig. 2 is a sectional view taken through the grater and the bowl along the line 2—2 of Figure 1.

Fig. 3 is a sectional view taken horizontally along the line 3—3 of Figure 2.

2

Fig. 4 is a view showing the grater and a portion of the bowl in end elevation.

Fig. 5 is a similar view looking at the opposite end of the grater.

Fig. 6 is a view of the grater showing its gripping members folded against its under face.

Fig. 7 is a perspective view of a fragment of one end portion of the grater.

Fig. 8 is a perspective view of a fragment of the other end of the grater.

Fig. 9 is a view upon an enlarged scale showing, in top plan, a number of the cutters of the grater.

Fig. 10 is a sectional view taken along the line 10—10 of Figure 9.

Fig. 11 is a sectional view taken along the line 11—11 of Figure 9.

Fig. 12 is a view showing a modified form of grater.

This improved food grater had a body 1 formed of stiff sheet metal and of greater length than width, the length being such that the grater may be set upon a receptacle 2, such as a bowl, pie pan, or the like, and extend across the top of the receptacle diametricaly thereof. Opposite side edge portions of the metal sheet from which the body is formed are rolled to form sleeves 3 and through these sleeves pass rods 4, which are circular in cross section so that the rods may be turned in the sleeves. The rods are of such length that they project from opposite ends of the sleeves and each rod has one end portion bent to form arms 5 which extend from the rods at right angles thereto and at their ends are bent back upon themselves to form blunt ends 6 for the arms. The portions of the rods which project from the other ends of the sleeves are of greater length than the end portions forming the arms or legs 5 and these end portions of the rods are bent to form arms 7. The arms 7 also extend from the rods at right angles thereto and are of greater length than the arms 5, and referring to Figures 2 and 7, it will be seen that the end portions forming the arms 7 are crimped to form fingers 8, which project from the arms inwardly thereof, in spaced relation to ends of the arms. The fingers extend longitudinally of the grater in parallel relation to the rods and are of such length that when the grater is applied to the receptacle with the arms 5 and 7 extending downwardly from ends of the sleeves, the arms 5 will have inner side portions in gripping engagement with the outer surface of the wall of the receptacle in spaced relation to each other circumferentially thereof, and ends of the fingers 8 will have abutting engagement with portions of the receptacle wall in spaced relation to each other. The distance between the arms 5 and ends of the fingers is less than the diameter of the receptacle with which the grater is used, and when the arms at opposite sides of the grater are swung towards each other the receptacle will be firmly gripped between the arms 5 and ends of the fingers 8 and prevented from shifting transversely or longitudinally out of position for use upon the receptacle. The fact that the fingers 8 are formed by crimping the end portions of the rods forming the arms 7 causes the fingers to have blunt ends which are rounded and will not catch or dig into the surface of the wall of the receptacle. Since extremities of the arms 7 project downwardly from the fingers 8 these arms and their fingers may be gripped between a thumb and finger of one hand and the grater firmly held upon the receptacle while the food to be grated is applied to the grater with the other hand and rubbed along the grater longitudinally thereof.

The cutters 9 occupy a portion of the grater in spaced relation to sides of the plate or body 1 and also spaced quite a distance from ends of the body and are arranged in rows extending transversely of the body, the cutters of each row being in offset or staggered relation to the cutters of adjoining rows so that when material to be grated is moved along the grater, flakes will be cut therefrom, for the full width of the material and the cutters of one row not interfere with action of cutters in adjoining rows. The cutters are formed by stamping the metal sheet forming the body 1, and referring to Figures 9, 10 and 11, it will be seen that when the metal sheet is cut and stamped there will be provided diamond shaped openings 10 extending longitudinally of the body and each spanned midway its length by a blade or cutter of inverted U-shape. Bridge portions of the cutters have their end portions tilted inwardly or outwardly, as shown clearly in Figure 10, and formed with sharp edges so that as the food is rubbed along the grater in contact with the cutters flakes will be cut therefrom, and these flakes pass through the openings 10 and fall into the receptacle. Since the group of cutters is spaced from sides of the body 1 and well away from ends thereof, all flakes cut from the food will drop into the receptacle and not be wasted by falling onto a table upon which the receptacle is placed or upon the floor of a kitchen. The fact that the group of cutters is spaced well away from ends of the body also eliminates likelihood of the fingers or other portions of a person's hand holding the food, from being scratched or cut by contact with sharp edges of the cutters. The grater may be used for grating cheese, hard vegetables, fruits, hard chocolate, potatoes, and other hard or relatively soft food articles and flakes are formed by use of the grater will be of substantially uniform size and free from lumps.

After the food has been grated pressure of the thumb and finger is removed from the arms 7 and these arms swung outwardly to rotate the rods and move the arms 5 and the fingers 8 to a position allowing removal of the grater from the receptacle. The grater may then be thoroughly cleaned and put away until again needed. Before the grater is put away the arms are swung inwardly and upwardly to a folded position close against the under face of the body 1, as shown in Figure 6, and referring to this figure it will be seen that the arms or legs and the fingers will be out of the way and not be liable to catch against other kitchen implements placed in a drawer in which the grater is kept when not in use.

Instead of mounting the grater across the top of a receptacle while it is in use it may be held in an upright or sloping position with its lower end resting upon a board kept in a kitchen for this purpose. When so used, the arms or legs will be left in the folded position against the under face of the body 1 and the upper end portion of the grater grasped with one hand while the food to be grated is held with the other hand and rubbed back and forth longitudinally of the grater in contact with the cutters. Since the group of cutters are spaced quite a distance from ends of the body, the hand grasping the upper end portion of the grater will not come in contact with the cutters and not be scratched or cut by the cutters.

In Figure 12 there has been shown a grater of a modified construction. In this embodiment of the invention the rods 4 are of greater length, and bending of end portions of the rods to form arms 5 is omitted. These end portions of the rods are straight from ends of the sleeves 3, to their ends and upon them are mounted arms or legs 11, which take the place of the arms 5. Lower ends of the arms 11 are bent back upon themselves to form blunt ends 12 and their upper ends are formed with eyes or sleeves 13 through which the rods 4 pass. By so mounting the arms 11, they may be slid along the rods until the grater had been adjusted to accommodate itself to the size of the bowl or other receptacle into which material is to be grated and set screws 14 carried by the sleeves 13 are then tightened to grip the rods and firmly hold the arms in an adjusted position.

Having thus described the invention, what is claimed is:

1. A grater comprising a body provided with cutters and openings through which material passes, at opposite sides of opposite ends of the body, the companion securing members at opposite ends of the body being securing members carried by said body and movable in unison from an operative position for gripping opposite side portions of a receptacle and holding the grater in position for use across a receptacle to a folded position against the body.

2. A grater comprising a flat body formed of sheet metal and provided with cutters and with openings through which grated material passes, and rods extending longitudinally of the body along opposite side edges thereof with portions projecting from ends of the body, said rods being rotatably mounted and having their projecting end portions bent to form fasteners at opposite ends of the body adapted to have swinging movement when the rods are turned and thereby moved from a folded position transversely of the body close against the under face of the body to a depending position for gripping opposite portions of walls of a container and holding the grater in place across the container in flat contacting engagement with the upper edges of the walls of the container.

3. A grater comprising a body formed of sheet metal and having opposite side edge portions formed with longitudinally extending sleeves open at their ends, rods extending longitudinally through said sleeves and rotatable therein and having end portions projecting from ends of the body, end portions of the rods projecting from one end of the body being bent to form arms for gripping the outer surface of an annular wall of a receptacle in spaced relation to each other circumferentially thereof, and the end portions of the rods projecting from the other end of the body being bent to form inwardly disposed arms having portions crimped to form fingers extending longitudinally of the body for extending under the adjoining end portion of the body in downwardly spaced relation thereto and having abutting engagement with the outer surface of the wall of the receptacle at opposite the side thereof from the first arms and cooperating with the first arms to grip the said receptacle wall and firmly secure the grater in position for use across the receptacle when the arms are swung downwardly to an opeative position.

4. A grater comprising a body formed of sheet metal and of a length adapting it to extend diametrically across an open-topped receptacle having an annular wall, opposite side edge portions being rolled downwardly and inwardly to form sleeves extending longitudinally of the body along opposite sides thereof and open at their ends, metal rods passing through said sleeves and rotatable therein and having end portions projecting from ends of the body, the protruding end portions of said rods being bent to form arms at opposite ends of the body, the arms at one end of the body each constituting a handle for rotating its rod and simultaneously swinging arms at opposite ends of the body downwardly from a folded position in which they extend transversely of the body adjacent the under face of the body to a depending position, and fingers extending from the handles under the adjoining end portion of the body and cooperating with the arms at the other end of the body for gripping the outer surface of opposite side portions of the receptacle wall and firmly holding the grater in position for use across the receptacle.

5. A grater comprising a body formed of sheet metal and having a portion cut and bent to form a group of cutters, the group of cutters being spaced from side edges of the body and spaced a greater distance from opposite ends of the body, each cutter consisting of an opening through the body spanned by a cutting strip of inverted U-shape projecting outwardly from the body transversely of the opening midway the length thereof to provide spaces at opposite sides of the cutting strip and having its bridge portion formed along opposite side edges with outstanding lips sharpened to form cutting edges.

6. A grater comprising a body formed of sheet metal and having portions cut and bent to form a plurality of cutters each consisting of an opening spanned midway its length by cutting strip, the opening being elongated longitudinally of the body and tapered towards its ends, and said cutting strip being disposed transversely of the body and the opening and having a bridge at its outer end sharpened along its opposite side edges.

LILLIAN DENNIS RICHARDS.

REFERENCES CITED

The following references are of record in the file of this patent:

UNITED STATES PATENTS

| Number | Name | Date |
|---|---|---|
| 555,834 | Taylor | Mar. 3, 1896 |
| 1,213,882 | Kettell | Jan. 30, 1917 |
| 1,633,700 | Hawkins | June 28, 1927 |
| 1,834,717 | Knapp | Dec. 1, 1931 |
| 1,915,869 | Rowley | June 27, 1933 |
| 2,049,128 | McConnell | July 28, 1936 |

FOREIGN PATENTS

| Number | Country | Date |
|---|---|---|
| 175,801 | Great Britain | Mar. 2, 1922 |

Certificate of Correction

August 24, 1948.

Patent No. 2,447,714.

LILLIAN DENNIS RICHARDS

It is hereby certified that errors appear in the printed specification of the above numbered patent requiring correction as follows:

Column 4, line 43, claim 1, after the word and comma "passes," insert *and securing members carried by the body*; lines 45 and 46, same claim, strike out "securing members carried by said body and"; and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*